(12) United States Patent
Price et al.

(10) Patent No.: US 8,593,573 B2
(45) Date of Patent: Nov. 26, 2013

(54) SYSTEM, METHOD AND APPARATUS FOR DETECTING DOCKING OF HEADPHONES

(75) Inventors: Pat William Price, Rhome Ranch, TX (US); Matthew Blake McRae, Laguna Beach, CA (US); John Schindler, Ladera Ranch, CA (US)

(73) Assignee: Vizio Inc., Irvine, CA (US)

( * ) Notice: Subject to any disclaimer, the term of this patent is extended or adjusted under 35 U.S.C. 154(b) by 822 days.

(21) Appl. No.: 12/637,372

(22) Filed: Dec. 14, 2009

(65) Prior Publication Data

US 2011/0141357 A1 Jun. 16, 2011

(51) Int. Cl.
- *H04N 7/00* (2011.01)
- *H04N 11/00* (2006.01)
- *H04N 5/44* (2011.01)
- *H04R 5/02* (2006.01)

(52) U.S. Cl.
USPC ............ 348/552; 348/553; 381/311; 381/107

(58) Field of Classification Search
USPC ............ 348/552, 734, 553; 381/14, 107, 370, 381/309, 311; 455/352, 66, 575
See application file for complete search history.

(56) References Cited

U.S. PATENT DOCUMENTS

| | | | |
|---|---|---|---|
| 6,041,225 A | | 3/2000 | Jung |
| 2006/0025206 A1* | | 2/2006 | Walker et al. .................. 463/20 |
| 2006/0135218 A1* | | 6/2006 | Son et al. ...................... 455/573 |
| 2007/0243909 A1* | | 10/2007 | Huang ........................ 455/569.1 |
| 2008/0181435 A1* | | 7/2008 | Ozaki et al. ................... 381/107 |
| 2009/0252344 A1* | | 10/2009 | Mao et al. ....................... 381/74 |
| 2009/0262254 A1* | | 10/2009 | Reams .......................... 348/734 |

* cited by examiner

*Primary Examiner* — Michael Lee

(74) *Attorney, Agent, or Firm* — Law Office of Scott C. Harris, Inc.

(57) ABSTRACT

An application for a television with a headphone dock. The headphone dock provides status to the television as to when a set of headphones are docked (idle) or undocked (in use). The television changes routing of audio signals based upon the status of the headphones.

21 Claims, 17 Drawing Sheets

SYSTEM, METHOD AND APPARATUS FOR DETECTING DOCKING OF HEADPHONES

FIELD

This invention relates to the field of television devices and more particularly to a system for detecting a docked situation for headphones associated with a television.

BACKGROUND

Television devices such as LCD or Plasma televisions produce high-quality sound, often to one or more speakers associated with the television. In some situations, headphones are associated with the televisions.

In the past, headphones were an after-thought or add-on that was not integrated into the television system. Even if a facility or jack was provided for connecting a headphone, the operation of the headphone was not anticipated by the television. The headphones simply received the same sound as provided by the television to the speakers. Several other audio systems such as radios mute sound from speakers when a headphone is plugged into their headphone jack. This type of operation is not feasible when the headphones are wireless being that there is no plug and unplug operation indicating the desire to use the headphones without sound coming from the speakers.

U.S. Pat. No. 6,041,225 to Jung describes wireless headphones associated with a monitor. This provides an enablement of such an association, but does not provide any automated operation within the monitor based upon activation of the wireless headphones. Instead, the system described includes a monitor remote control integrated into the wireless headphones. This requires the user of the headphones to press buttons to switch the audio from the speakers to the headphones and visa versa. There is no docking/charging system described that detects the absence of the headphones and takes steps based upon such information.

What is needed is a television system that will detect active use of a set of headphones and configure itself to take advantage of such.

SUMMARY

A television with a headphone dock is desclosed in which the television is aware of when the headphones are docked on the dock or undocked, e.g., in use. The television changes routing of audio information based upon the status of the headphones, for example, muting the television speakers when the headphones are active.

In one embodiment, a television system is disclosed including a television that has a wireless device for transmitting interfaced to a processing element. The system includes a wireless headphone that has a wireless device for receiving audio from the wireless device of the television. A device for holding the wireless headphone is associated with the television and has a mechanism for relaying a status of the wireless headphones to the processing element.

In another embodiment, a method for controlling a television responsive to wireless headphones is disclosed including providing a television that has a wireless transmitter and a processing element and providing a wireless headphone that has a rechargeable power source and a wireless receiver, the wireless receiver being powered by the rechargeable power source. A holder is also provided and has a device that detects the status of the wireless headphones and relays the status to the processing element. The method includes detecting a change of the status and if the change indicates the headphones are active, enabling the wireless transmitter to send an audio signal from the television to the wireless receiver and disabling speakers associated with the television. If the change indicates the headphones are inactive, the wireless transmitter is disabled and the audio signal is routed from the television to the speakers associated with the television.

In another embodiment, a television system is disclosed including a television having a wireless transceiver and a processing element. The processing element is interfaced to the wireless transceiver. A wireless headphone has a wireless transceiver, a rechargeable power source and at least one ear piece. The at least one ear piece converts an electrical audio signal detected by the wireless transceiver within the headphone into sound waves. A holder is associated with the television and has a place to hold the wireless headphone and a detector. The detector signals the processing element when the wireless headphones are in place on the holder.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
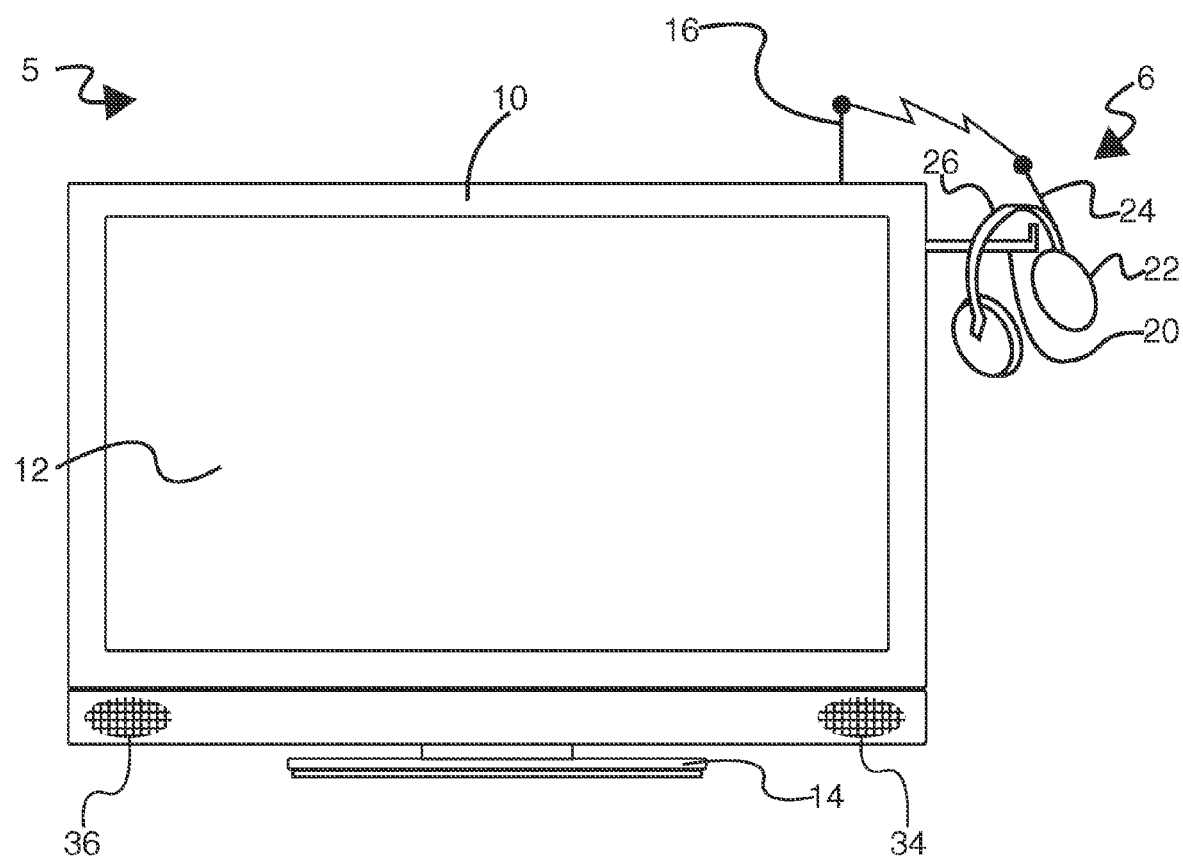
FIG. 1 illustrates an exemplary television with an integrated headphone docking apparatus.

Reference will now be made in detail to the presently preferred embodiments, examples of which are illustrated in the accompanying drawings. Throughout the following detailed description, the same reference numerals refer to the same elements in all figures. The bezel of is the facing surface surrounding an image producing surface such as an LCD panel, CRT, Plasma panel, OLED panel and the like.

Referring to FIG. 1, a plan view of an exemplary television 5 with an integrated headphone docking apparatus will be described. The exemplary television 5 has a display panel 12 such as a Plasma panel, Liquid Crystal Display (LCD) panel, a Light Emitting Diode (LED) panel, an Organic Light Emitting Diode (OLED) panel, a Cathode Ray Tube (CRT) or any other suitable display panel as known in the industry. The exemplary television 5 also has a stand 14, though flat screen televisions are often wall-mounted (e.g., the stand 14 is removed and the television 5 is affixed to a wall mounting bracket). A bezel 10 frames the display panel 12 to cover the frame/electronics of the display panel (not visible). In many exemplary televisions 5, one or more speakers 34/36 are located in such a way that sound from the speakers 34/36 passes out of the television's enclosure to be listened to by a viewer.

In the example shown in FIG. 1, a set of headphones 6 are shown hooked on a headphone hook 20. The headphones 6 have a headband 26 and one or two ear-pieces 22 that reproduce sound in the vicinity of a wearer's ears, hence providing high-quality audio to the wearer while not disturbing others in the vicinity of the wearer. The headphone hook 20 serves as a place to store the headphones 6 when they are not in use, making them readily accessible and easy to find. In this embodiment, the headphones 6 are wireless, having internal circuitry that receives a wireless signal through an antenna 24. The sound is modulated on a radio frequency (or infrared) carrier within the television 5 and transmitted from the television antenna 16 to the headphone antenna 24.

Figure 2:
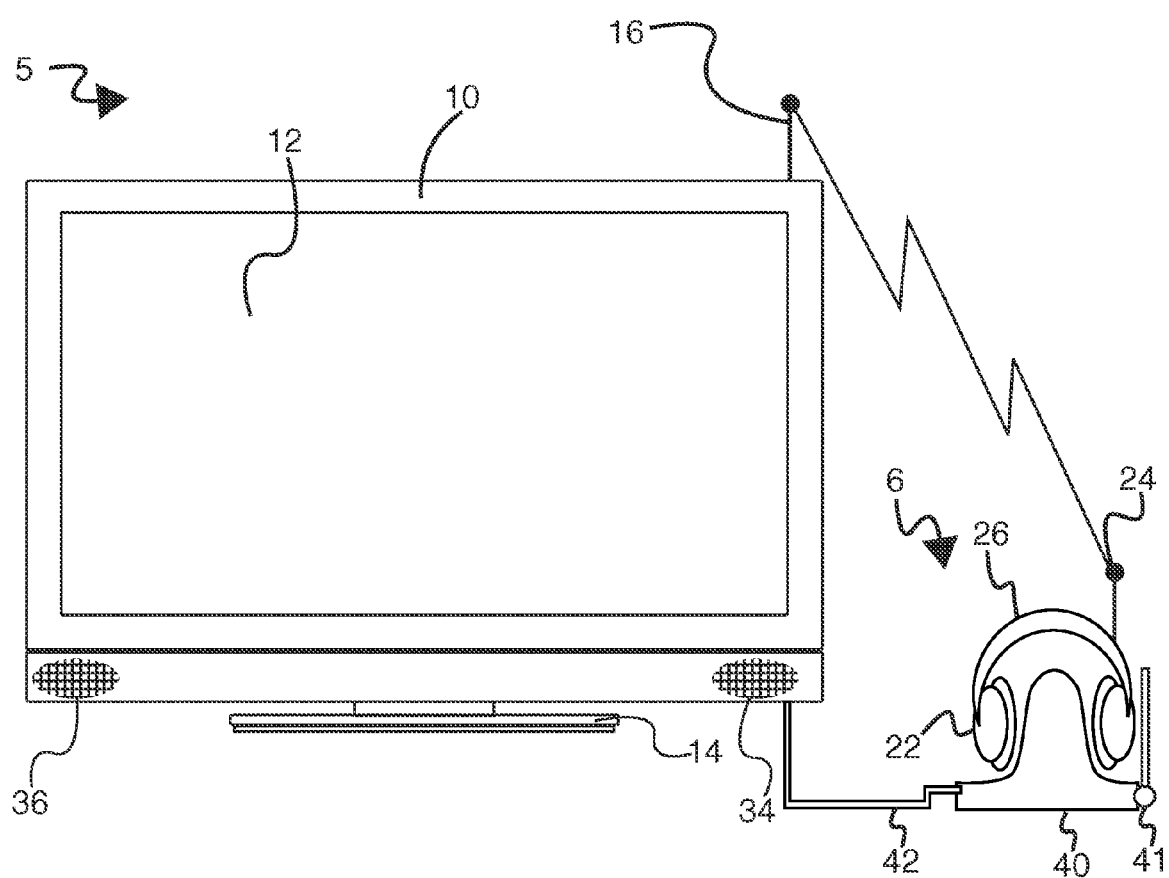
FIG. 2 illustrates an exemplary television with an external headphone docking apparatus.

Referring to FIG. 2, a plan view of an exemplary television with an external headphone docking apparatus will be described. As in FIG. 1, the exemplary television 5 has a display panel 12. The exemplary television 5 also has a stand 14, though flat screen televisions are often wall-mounted (e.g., the stand 14 is removed and the television 5 is affixed to a wall mounting bracket). A bezel 10 frames the display panel 12 to cover the frame/electronics of the display panel (not visible). In many exemplary televisions 5, one or more speakers 34/36 are located in such a way that sound from the speakers 34/36 passes out of the television's enclosure to be listened to by a viewer.

In the example shown in FIG. 2, a set of headphones 6 are shown hooked on a headphone docking station 40. The headphones 6 have a headband 26 and one or two ear-pieces 22 that reproduce sound in the vicinity of a wearer's ears, hence providing high-quality audio to the wearer while not disturbing others in the vicinity of the wearer. The headphone docking station 40 serves as a place to store the headphones 6 when they are not in use, making them readily accessible and easy to find. In this embodiment, the headphones 6 are also wireless, having internal circuitry that receives a wireless signal from the television antenna 16 through an antenna 24 on the headphones. The sound is modulated on a radio frequency (or infrared) carrier within the television 5 and transmitted from the television antenna 16 to the headphone antenna 24. In this means for holding the headphones 6, the headphone docking station 40 receives power through a cable 42 connected to the television 5. In alternate embodiments, the headphone docking station 40 receives audio through audio output signals through the cable 42. In such embodiments, the headphone docking station 40 modulates the audio on a wireless signal such as a radio frequency signal and the modulated signal is transmitted from the headphone docking station antenna 41 to the headphone antenna 24.

Figure 3:
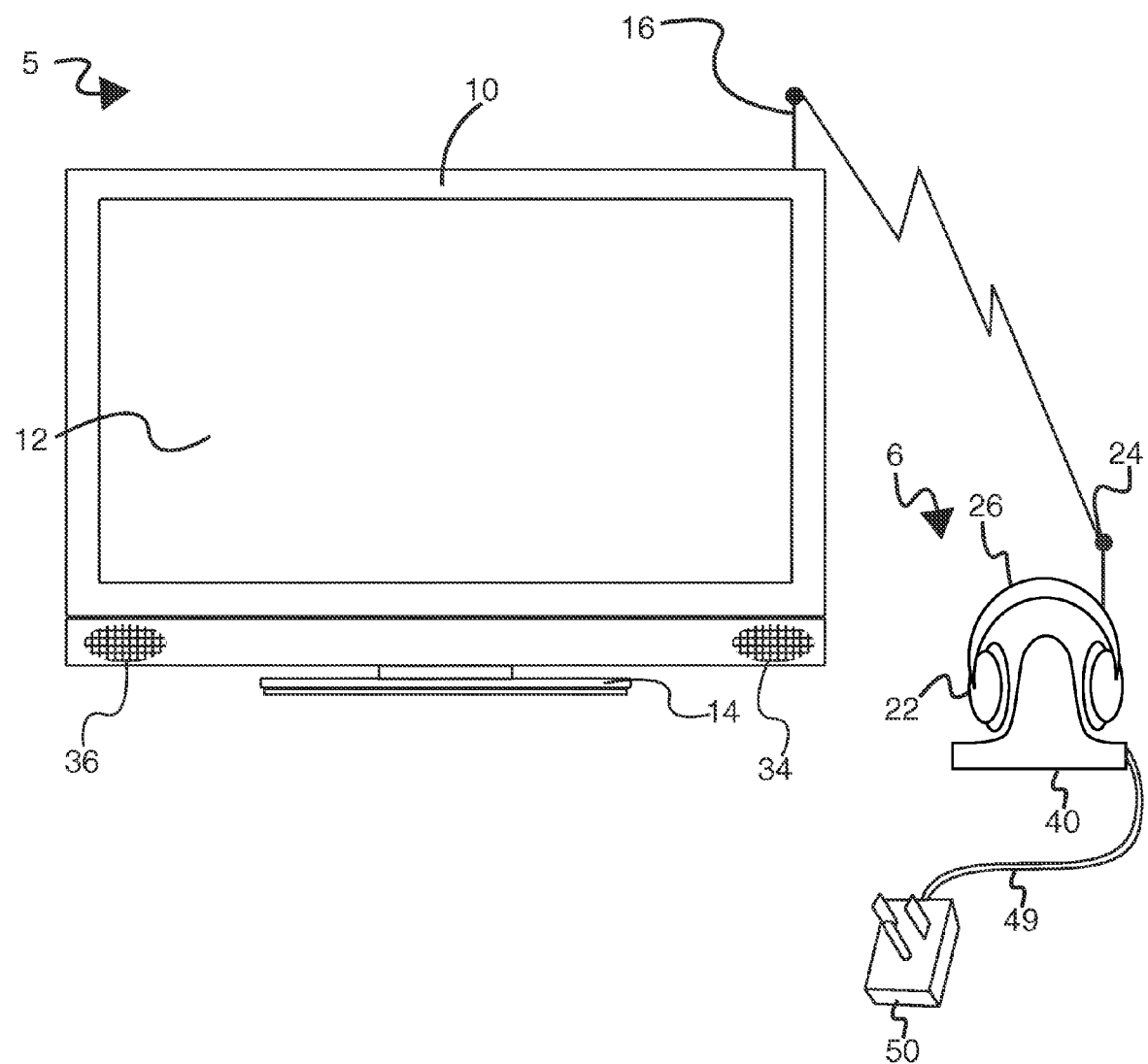
FIG. 3 illustrates an exemplary television with a wireless external headphone docking apparatus.

Referring to FIG. 3, a plan view of an exemplary television with a wireless external headphone docking apparatus will be described. As in FIGS. 1 and 2, the exemplary television 5 has a display panel 12. The exemplary television 5 also has a stand 14, though flat screen televisions are often wall-mounted (e.g., the stand 14 is removed and the television 5 is affixed to a wall mounting bracket). A bezel 10 frames the display panel 12 to cover the frame/electronics of the display panel (not visible). In many exemplary televisions 5, one or more speakers 34/36 are located in such a way that sound from the speakers 34/36 passes out of the television's enclosure to be listened to by a viewer. The headphone docking station 40 has a source of power such as a power brick 50 for sending power to the headphone dock 40 through wires 49. The power is used, in this example, for charging rechargeable batteries 62 (see FIGS. 9 and 10) within the headphones 6.

In the example shown in FIG. 3, a set of headphones 6 are shown hooked on a headphone docking station 40. The headphones 6 have a headband 26 and one or two ear-pieces 22 that reproduce sound in the vicinity of a wearer's ears, hence providing high-quality audio to the wearer while not disturbing others in the vicinity of the wearer. The headphone docking station 40 serves as a place to store the headphones 6 when they are not in use, making them readily accessible and easy to find. In this embodiment, the headphones 6 are also wireless, having internal circuitry that receives a wireless signal through an antenna 24. The sound is modulated on a radio frequency (or infrared) carrier within the television 5 and transmitted from the television antenna 16 to the headphone antenna 24.

Figure 4:
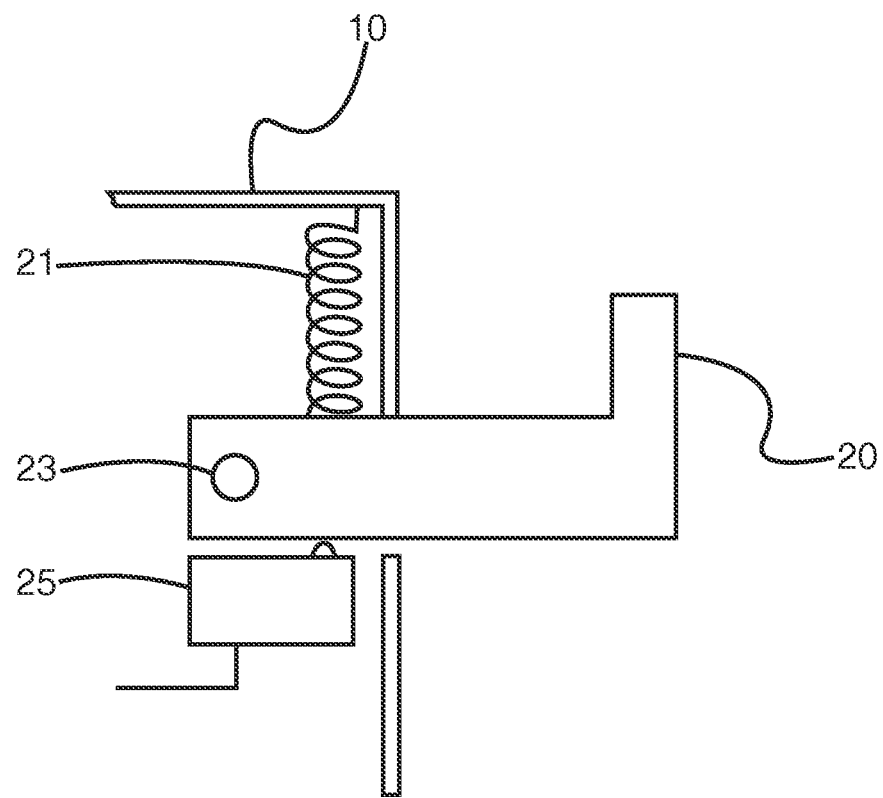
FIG. 4 illustrates a detail view of an integrated headphone docking apparatus integrated into an exemplary television without a docked set of headphones.

Referring to FIG. 4, a detail view of an integrated headphone docking apparatus integrated into an exemplary television is shown without a docked set of headphones. In this means for holding the headphones 6, a headphone hook 20 has a reception area for accepting a headphone 6. The hook 20 extends through the bezel 10 or side surface of the television 5. Internal to the television 5, the hook 20 is anchored by a pivot 23 and held upwardly by a spring 21. When a headphone 6 is placed on the hook 20, the weight of the headphone 6 counters the force of the spring 21, and the hook 20 lowers to rest on the opening of the bezel 10, depressing a micro switch 25 or other means of detecting the presence of the headphone 6 such as a magnet/reed relay, light interruption detector, etc.

Figure 5:
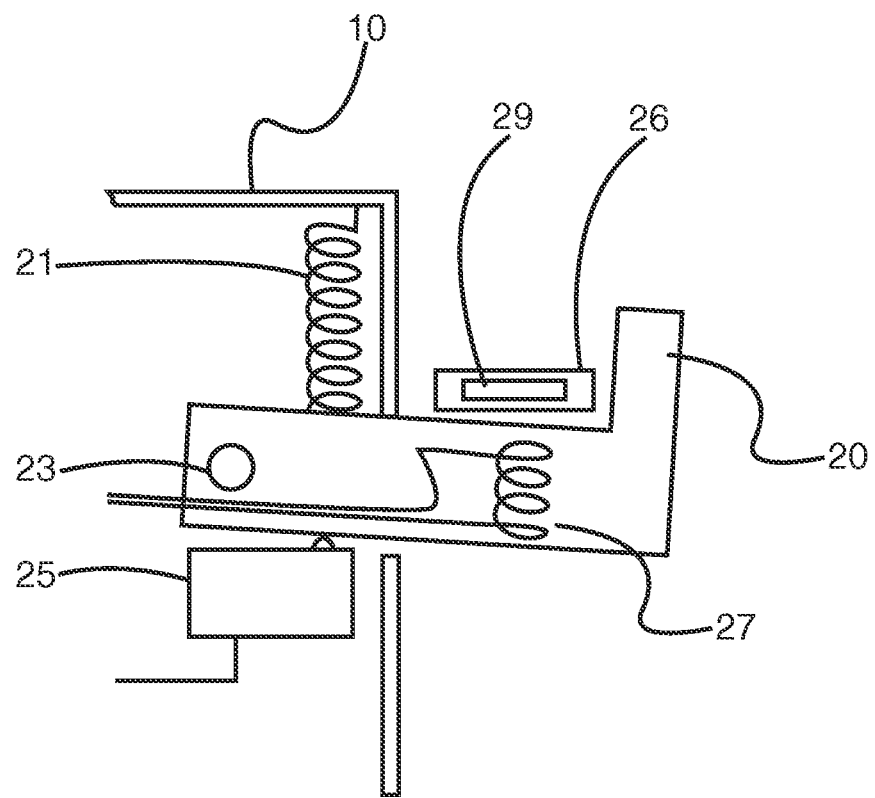
FIG. 5 illustrates a detail view of an integrated headphone docking apparatus integrated into an exemplary television with a first embodiment of docked headphones.

Referring to FIG. 5, a detail view of an integrated headphone docking apparatus integrated into an exemplary television is shown with headphones docked. In this example, the headphone hook 20 has a receiver 20 for accepting a headphone 6. The hook 20 extends through the bezel 10 or side surface of the television 5. Internal to the television 5, the hook 20 is anchored by a pivot 23 and held upwardly by a spring 21. As shown, the headphone 6 is placed on the hook 20, the weight of which countering the force of the spring 21 resulting in the hook 20 depressing a micro switch 25. A logic signal from the micro switch 25 is used internally by the television 5 to change operation based upon the usage of the headphone 6.

Also, in this example, the headphone 6 has an internal rechargeable battery 62 (see FIG. 10) that is recharged through a receiving coil 29 within the headphone's headband 26. As a means for transferring power to the headphones 6, an AC signal is applied to a coil 27 within the hook 20 that causes current to flow in the receiving coil 29 within the headphones 6. Voltage from the receiving coil is used to charge the rechargeable battery 62 (see FIG. 10).

Figure 6:
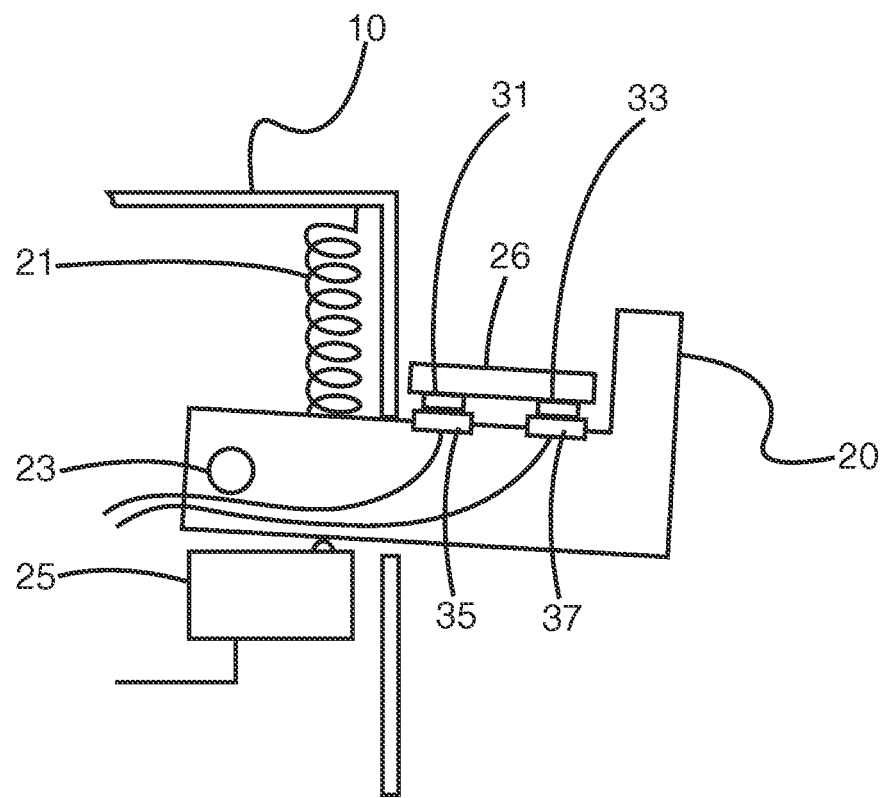
FIG. 6 illustrates a detail view of an integrated headphone docking apparatus integrated into an exemplary television with a second embodiment of docked headphones.

Referring to Referring to FIG. 6, a detail view of an integrated headphone docking apparatus integrated into a television is shown with docked headphones. In this means for holding the headphones, the headphone hook 20 has a receiver 20 for accepting a headphone 6. The hook 20 extends through the bezel 10 or side surface of the television 5. Internal to the television 5, the hook 20 is anchored by a pivot 23 and held upwardly by a spring 21. As shown, a headphone 6 is placed on the hook 20; the weight of the headphone 6 countering the force of the spring 21 resulting in the hook 20 depressing a micro switch 25. A signal from the switch 25 is used internally by the television 5 to change operation based upon the usage of the headphone 6.

Also, in this example, the headphone 6 has an internal rechargeable battery 62 (see FIG. 9) that is recharged through contacts 31/33 on the headphone's headband 26. This means for transferring power to the headphones 6 accepts power from a television power supply (not shown—known in the industry) and applies power to matching contacts 35/37 on an upper surface of the hook 20 such that current flows into the contacts 31/33 on the headband 26 and is used to charge the rechargeable battery 62 (see FIG. 10).

Figure 7:
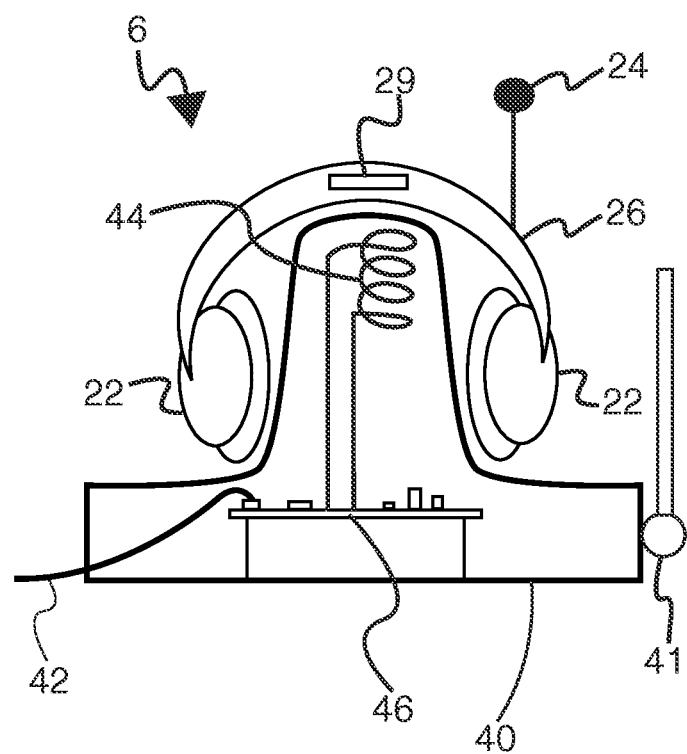
FIG. 7 illustrates a detail view of an external headphone docking apparatus associated with an exemplary television with a first embodiment of docked headphones.

Referring to FIG. 7, a detail view of an external headphone docking apparatus associated with an exemplary television with docked headphones will be described. In this example, the headphone 6 has an internal rechargeable battery 62 (see FIG. 10) that is recharged through a receiving coil 29 within the headphone's headband 26. This means for transferring power to the headphone 6 has an AC signal generated by circuitry 46 within the headphone docking station 40 and applied to a matching coil 44 within the headphone docking station 40 that causes current to flow in the receiving coil 29. Voltage from the receiving coil is used to charge the rechargeable battery 62 (see FIG. 10).

Figure 8:
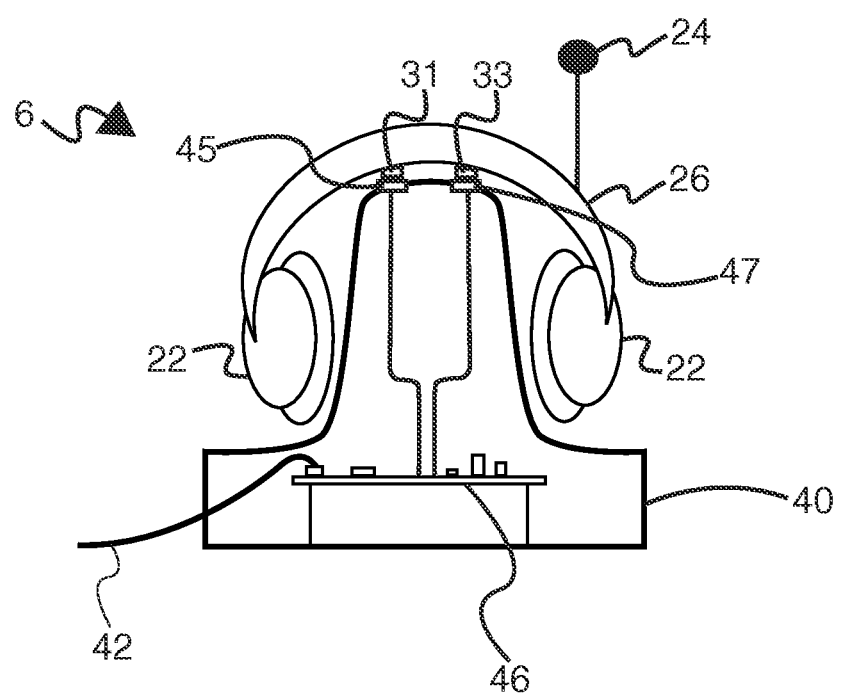
FIG. 8 illustrates a detail view of an external headphone docking apparatus associated with an exemplary television with a second embodiment of docked headphones.

Referring to FIG. 8, a detail view of an external headphone docking apparatus associated with an exemplary television with docked headphones will be described. In this example, the headphone 6 has an internal rechargeable battery 62 (see FIG. 9) that is recharged through contacts 31/33 on the headphone's headband 26. As a means for transferring power to the headphones 6, power from circuitry 46 within the headphone docking station 40 is applied to matching contacts 45/47 on an upper surface of the headphone docking station 40 and current flows into the contacts 31/33 on the headband 26 and is used to charge the rechargeable battery 62 (see FIG. 10).

The above are but examples of ways to charge a rechargeable power source within a headphone 6 and other ways are known in the industry such as radio frequency emissions, photo-electric, etc, all of which are anticipated and included here within.

Figure 9:
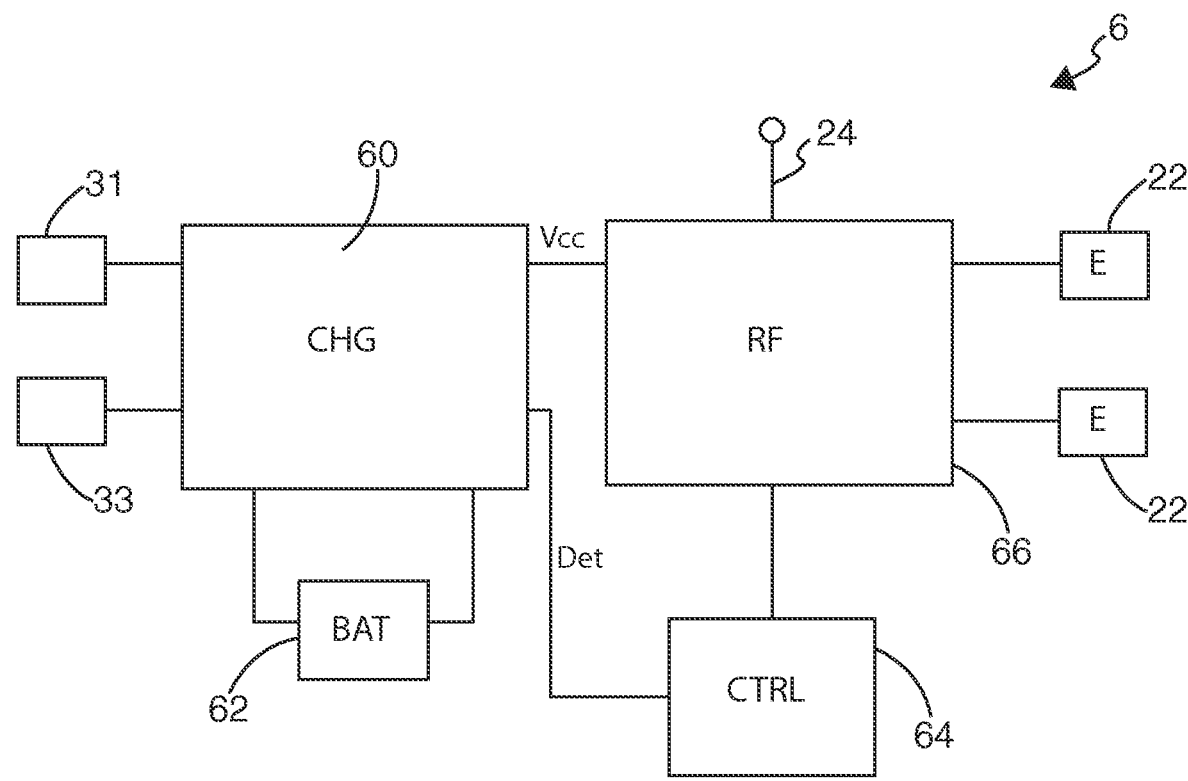
FIG. 9 illustrates a plan view of a first exemplary headphone of the present invention.

Referring to FIG. 9, a plan view of a first exemplary headphone will be described. In this example of a headphone 6 having charging contacts 31/33, power from the charging contacts 31/33 is provided to a charging circuit 60 which controls charging of an internal power source 62 (e.g., rechargeable battery, capacitor, super capacitor, etc). The charging circuit 60 also provides power to other circuitry within the headphones 6, such as the RF circuit 66. The RF circuit 66 receives and/or transmits a radio frequency signal to and/or from an antenna 24. In some embodiments, the transmission is an RF signal modulated with audio. In some embodiments, the transmission is an RF signal modulated with a digitally encoded audio signal. Any wireless transmission is anticipated. The audio is extracted and/or decoded by the RF circuitry 66 as known in the industry and provided to the earpiece(s) 22.

The power status from the charge control 60 is provided to control logic 64 to enable/disable the RF circuit 66. For example, when charging (e.g., docked), the RF circuit 66 is disabled since the headphones 6 are not in use. In embodiments in which the transmission is two-way, various situations are detected by the control logic 64 such as "docked" and "battery low" and either used internally (as above) or communicated to the television 5 though the RF circuit 66 transmitting a signal back to the television 5. In this, the television 5 responds to the signal by changing operation. For example, on low-battery, the television displays a message informing the viewer/listener to return the headphone 6 to the docking station for charging (see FIG. 17). As another example, when the headphone is docked, the television 5 sends audio to the internal speakers 34/36 and when undocked (e.g., in use), the television 5 sends audio only to the headphones 6.

Figure 10:
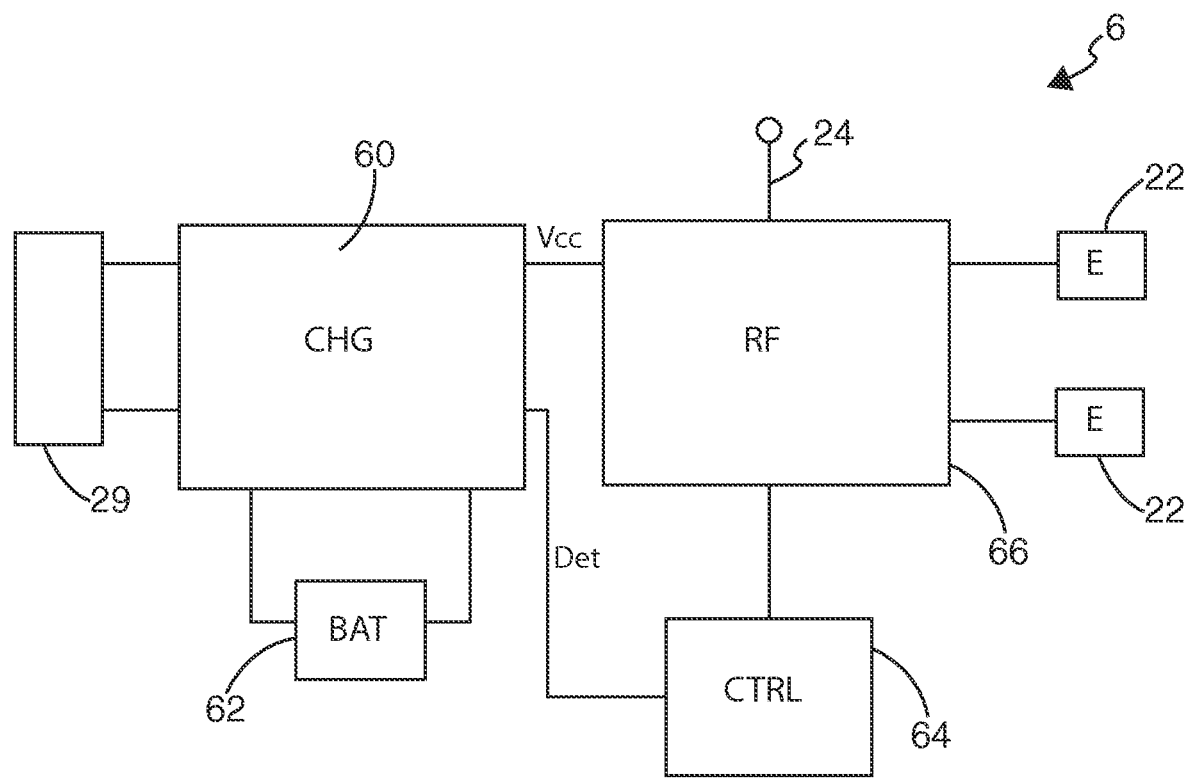
FIG. 10 illustrates a plan view of a second exemplary headphone of the present invention.

Referring to FIG. 10, a plan view of a second exemplary headphone will be described. In the example of a headphone 6 having charging coil 29, power from the charging coil 29 is provided to a charging circuit 60 which controls charging of an internal power source 62 (e.g., rechargeable battery, capacitor, super capacitor, etc). The charging circuit 60 also provides power to other circuitry within the headphones 6, such as the RF circuit 66. The RF circuit 66 receives and/or transmits a radio frequency signal to and/or from an antenna 24. In some embodiments, the transmission is an RF signal modulated with audio. In some embodiments, the transmission is an RF signal modulated with a digitally encoded audio signal. Any wireless transmission method is anticipated. The audio is extracted and/or decoded by the RF circuitry 66 as known in the industry and provided to the earpiece(s) 22.

The power status from the charge control 60 is provided to control logic 64 to enable/disable the RF circuit 66. For example, when charging (e.g., docked), the RF circuit 66 is disabled since the headphones 6 are not in use. In embodiments in which the transmission is two-way, various situations are detected by the control logic 64 such as "docked" and "battery low" and either used internally (as above) or communicated to the television 5 though the RF circuit 66 transmitting a signal back to the television 5. In this, the television 5 responds to the signal by changing operation. For example, on low-battery, the television displays a message informing the viewer/listener to return the headphone 6 to the docking station for charging. As another example, when the headphone is docked, the television 5 sends audio to the internal speakers 34/36 and when undocked (e.g., in use), the television 5 sends audio only to the headphones 6.

Figure 11:
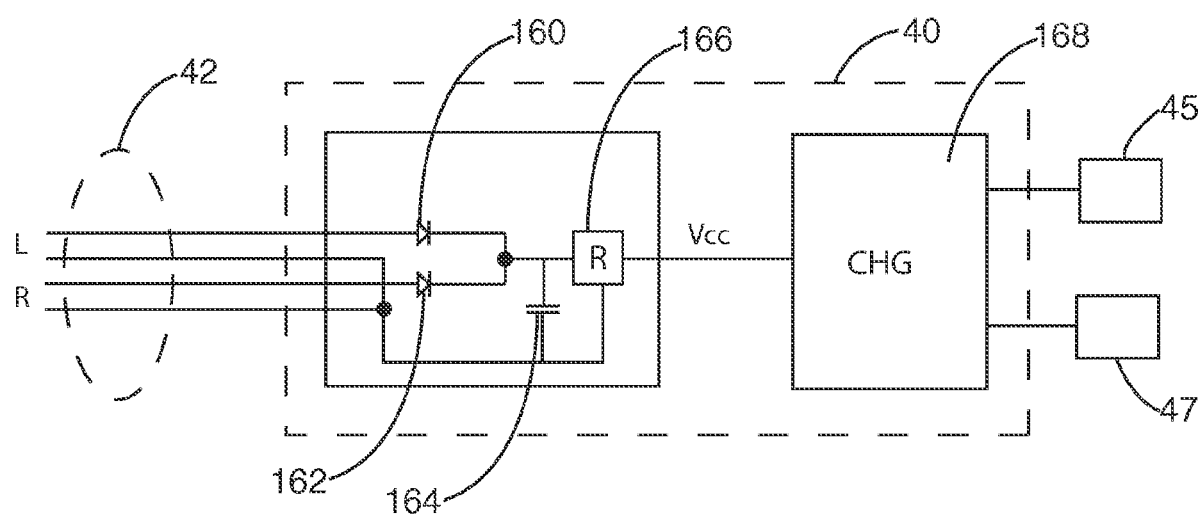
FIG. 11 illustrates a schematic view of the first exemplary external headphone dock of the present invention.

Referring to FIG. 11, a schematic view of the first exemplary external headphone dock is shown. In this example, the headphone docking station 40 is connected to an audio output of the television 5 through left and right audio wires 42. It is anticipated that the audio wires carry audio, for example, speaker output or analog audio output. To derive power within the headphone docking station 40, the audio is rectified into a DC voltage by diodes 160/162 and smoothed with a capacitor 164, as known in the industry. The output voltage, Vcc, is then routed to the charge control circuit 168 which, in some embodiments, boosts the voltage and provides a DC potential to contacts 45/47. In this means to transfer power to the headphones 6, the docking station contacts 45/47 connect to the contacts 31/33 of the headphones 6 when the headphones 6 are docked, thereby transferring power to charge the rechargeable power source 62 within the headphones 6.

Figure 12:
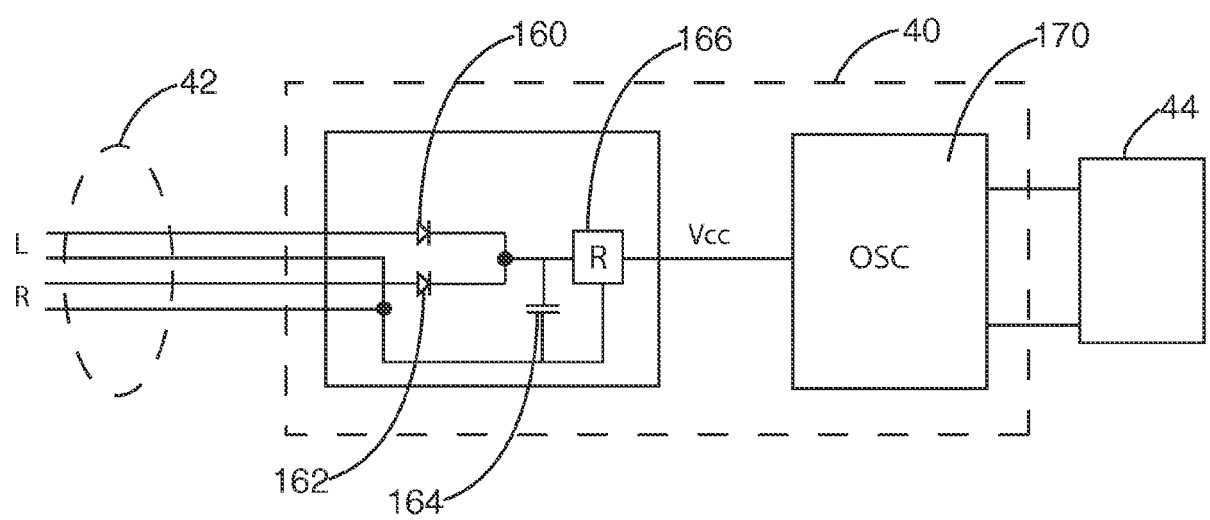
FIG. 12 illustrates a schematic view of the second exemplary external headphone dock of the present invention.

Referring to FIG. 12, a schematic view of the second exemplary external headphone dock will be described. In this example, the headphone docking station 40 is connected to an audio output of the television 5 through left and right audio wires 42. It is anticipated that the audio wires carry audio, for example, speaker output or analog audio output. To derive power within the headphone docking station 40, the audio is rectified into a DC voltage by diodes 160/162 and smoothed with a capacitor 164 and regulated by a voltage/current regulator 166, as known in the industry. The output voltage from the regulator 166 is then routed to the oscillator 170 which provides an AC voltage to a coil 44. The coil 44 is a means for transferring power to the headphones 6 and couples to a mating coil 29 of the headphones 6 when the headphones 6 are docked on the headphone docking station 40, providing current to the headphones 6 for charging the internal rechargeable power source 62.

Figure 13:
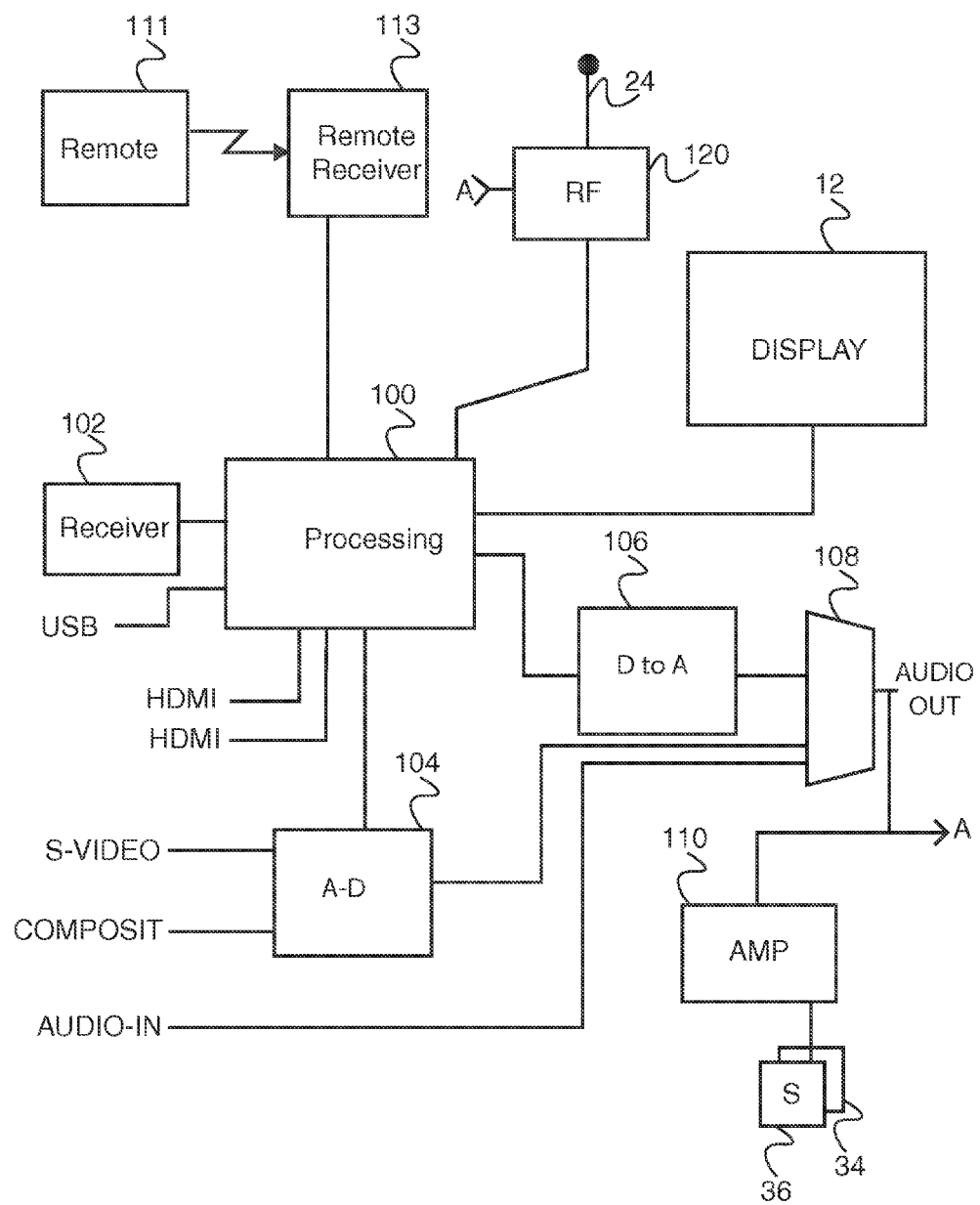
FIG. 13 illustrates a first exemplary schematic view of an exemplary television.

Referring to FIG. 13, a first exemplary schematic view of an exemplary television will be described. This figure is intended as a representative schematic of a typical monitor/television 5 and in practice, some elements are not present in some monitors/televisions 5 and/or additional elements are present in some monitors/televisions 5 as known in the industry. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 34/36.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In the example shown, the selected audio output A from the multiplexer 108 and/or digital audio from the processing element 100 are routed to a radio frequency transmitter 120. The radio frequency transmitter 120 modulates the audio signal onto a radio frequency and transmits it to the headphones 6 through an antenna 24. The modulation is any known modulation, including, but not limited to, amplitude modulation, frequency modulation, pulse-code modulation with either analog or digital encoding. In some embodiments, the radio frequency transmitter 120 is a radio frequency transceiver 120 in which, encoded information is also received from the headphones 6, for example, the status of the battery 62 or an indication of whether the headphones 6 are in use or docked.

Figure 14:
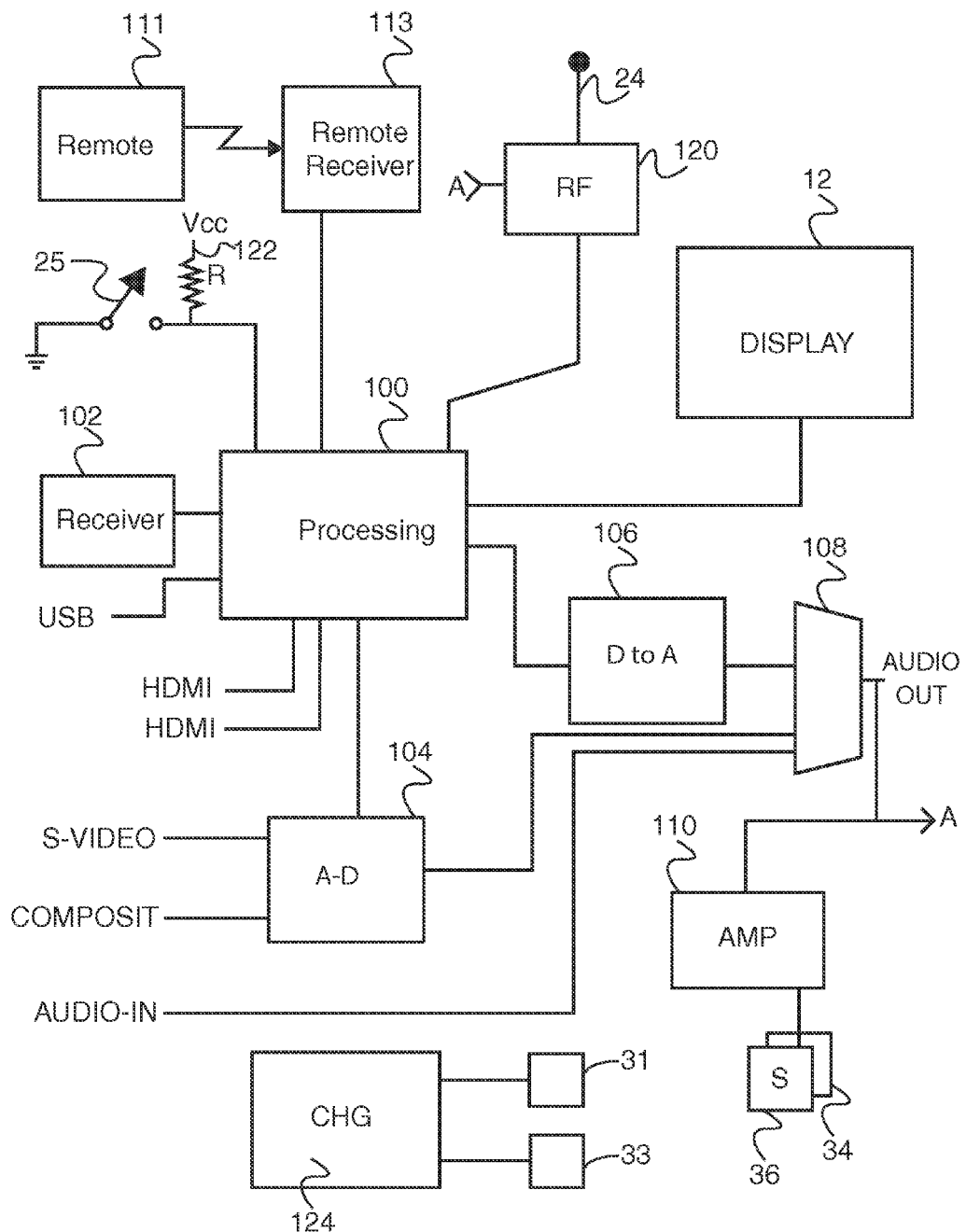
FIG. 14 illustrates a second exemplary schematic view of an exemplary television.

Referring to FIG. 14, a second exemplary schematic view of an exemplary television will be described. This figure is intended as a representative schematic of a typical monitor/television 5 and in practice, some elements are not present in some monitors/televisions 5 and/or additional elements are present in some monitors/televisions 5 as known in the industry. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 34/36.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In the example shown, the selected audio output A from the multiplexer 108 and/or digital audio from the processing element 100 are routed to a radio frequency transmitter 120. The radio frequency transmitter 120 modulates the audio signal onto a radio frequency and transmits it to the headphones 6 through an antenna 24. The modulation is any known modulation, including, but not limited to, amplitude modulation, frequency modulation, pulse-code modulation with either analog or digital encoding. In some embodiments, the radio frequency transmitter 120 is a radio frequency transceiver 120 in which, encoded information is also received from the headphones 6, for example, the status of the battery 62 or an indication of whether the headphones 6 are in use or docked.

In this example, a micro switch 25 interfaces to the processing element 100, providing a signal to the processing element of whether the headphones 6 are on the hook 20 or not. Although a pull-up resistor 122 is shown biasing the input to the processing element 100, any known switch input arrangement is anticipated.

Also, in this example, a charge control 124 is provided within the television 5 accepting power from the television power supply (not shown) as known in the industry and providing voltage and/or current limited power to the contacts 31/33 for power transfer to the headphones 6 when the headphones 6 are on the hook 20.

Figure 15:
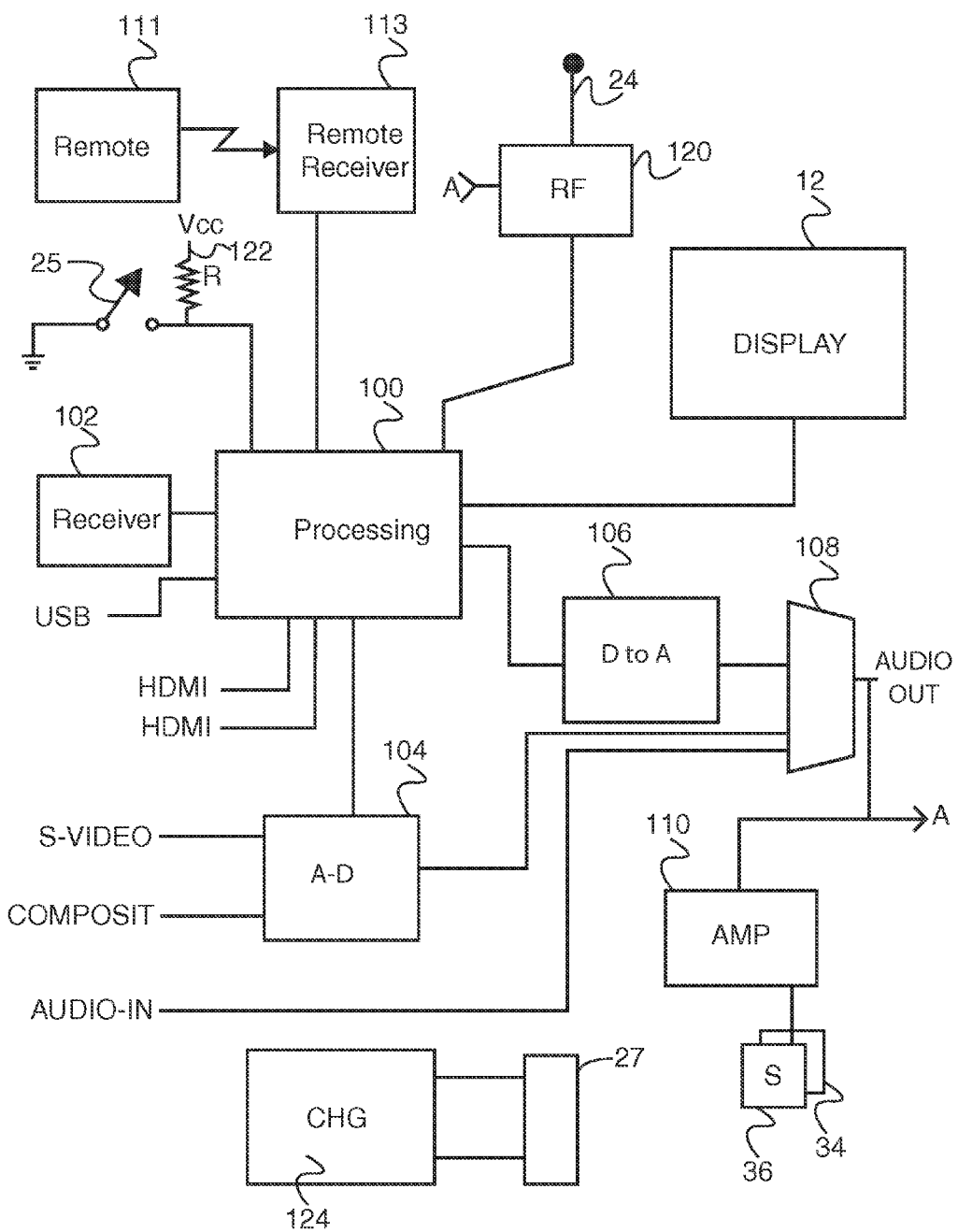
FIG. 15 illustrates a third exemplary schematic view of an exemplary television.

Referring to FIG. 15, a third exemplary schematic view of an exemplary television will be described. This figure is intended as a representative schematic of a typical monitor/television 5 and in practice, some elements are not present in some monitors/televisions 5 and/or additional elements are present in some monitors/televisions 5 as known in the industry. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 34/36.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In the example shown, the selected audio output A from the multiplexer 108 and/or digital audio from the processing element 100 are routed to a radio frequency transmitter 120. The radio frequency transmitter 120 modulates the audio signal onto a radio frequency and transmits it to the headphones 6 through an antenna 24. The modulation is any known modulation, including, but not limited to, amplitude modulation, frequency modulation, pulse-code modulation with either analog or digital encoding. In some embodiments, the radio frequency transmitter 120 is a radio frequency transceiver 120 in which, encoded information is also received from the headphones 6, for example, the status of the battery 62 or an indication of whether the headphones 6 are in use or docked.

In this example, a micro switch 25 interfaces to the processing element 100, providing a signal to the processing element of whether the headphones 6 are on the hook 20 or not. Although a pull-up resistor 122 is shown biasing the input to the processing element 100, any known switch input arrangement is anticipated.

Also, in this example, a charge control 124 is provided within the television 5 accepting power from the television power supply (not shown) as known in the industry and providing AC power to the coil 27 for power transfer to the coil 29 within the headphones 6 when the headphones 6 are on the hook 20.

Figure 16:
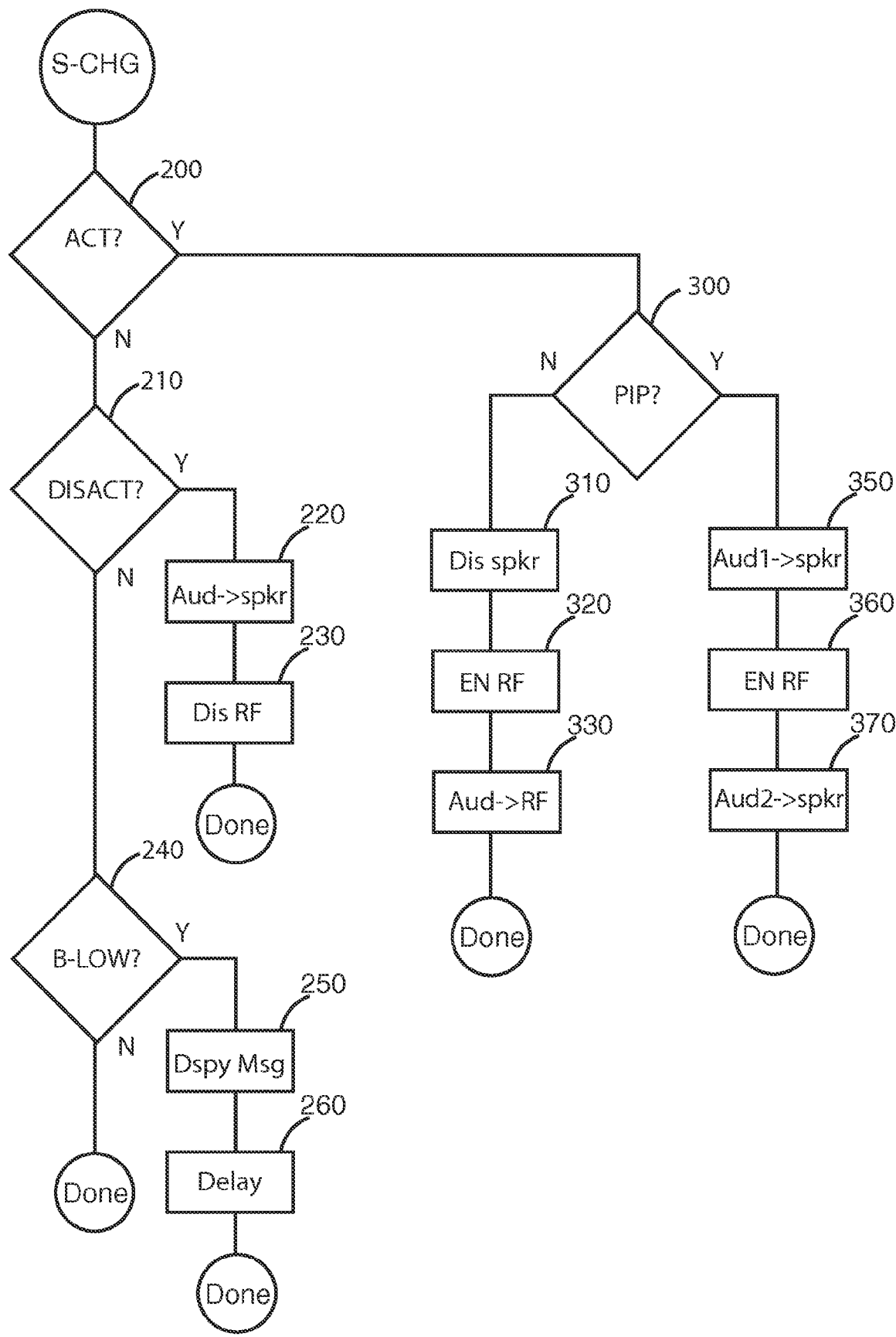
FIG. 16 illustrates a flow chart of the present invention.

Referring to FIG. 16, a flow chart will be described. In this exemplary program flow executed by the processing element 100, a status change of the headphone 6 has been detected (e.g., by the micro switch 25, reception of a wireless indication, or a change of charge current detected by the controller 64). The program determines if the status change is activation 200 of the headphones 6 (e.g., the headphones were removed from the clip 20 or headphone docking station 40). If it is activation 200, the program determines if picture-in-picture (PIP) is active 300. If PIP is not active 300, the television's speakers 34/36 are disabled 310, the radio frequency transmitter 120 is enabled 320 and the audio output is routed 330 to the radio frequency transmitter 120 such that, the viewer listens to the audio output through the headphones 6. If PIP is active 300, the first audio channel (e.g., main program or primary audio channel) is sent to the television's speakers 34/36 350, the radio frequency transmitter 120 is enabled 360 and the second audio channel (e.g., PIP program or secondary audio channel) is routed 370 to the radio frequency transmitter 120 such that, one viewer listens to the secondary audio output through the headphones 6 and another viewer listens to the primary audio output through the speakers 34/36. It is anticipated that, under viewer control, the primary audio channel is sent to the headphones 6 and the secondary audio channel is sent to the speakers 34/36. It is anticipated that the desired routing of audio based upon a current operation of the television 5 and the status of the headphones is controlled through user interfaces (on-screen displays) and the remote control 111, as known in the industry.

If the status change is deactivation 210 of the headphones 6 (e.g., by depression of the micro switch 25, reception of a wireless indication, or a change of charge current detected by the controller 64), the audio is routed 220 to the speakers 34/36 and the radio frequency transmitter 120 is disabled 230.

If the status change is a battery-low condition 240, a message is displayed 250 on the display panel 12 and a delay is taken 260 to provide time for the viewer to see the message.

Many other actions in response to the possible status changes are anticipated including periodically displaying the battery low message, displaying an opaque message or icon indicating battery-low, different routing and/or muting of audio channels, etc.

Figure 17:
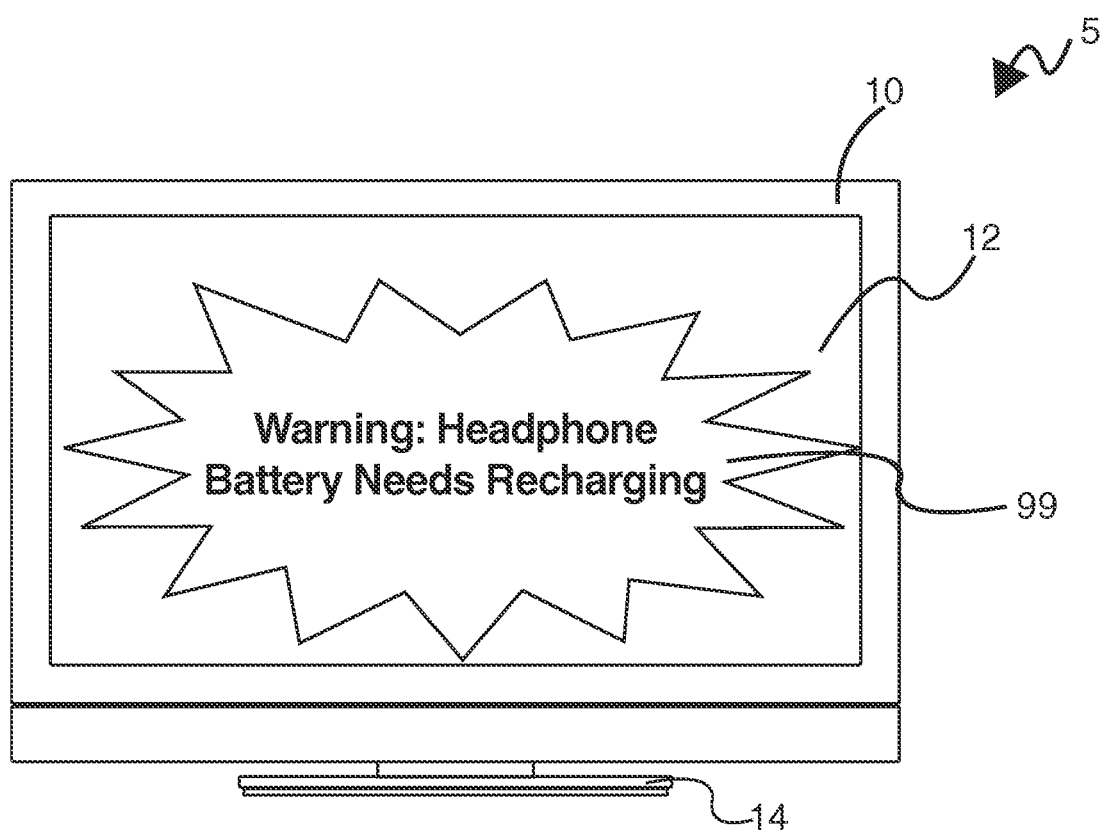
FIG. 17 illustrates a plan view of a typical user interface of the present invention.

Referring to FIG. 17, a plan view of a typical user interface will be described. The message 99 is displayed when the processing element 100 receives a signal from the headphones 6 that the internal battery 62 within the headphones 6 needs to be recharged. Any appropriate message is anticipated, including an opaque message 99 showing words or an icon (e.g., image of battery in red). In this, the RF unit 120 of the television is also a television wireless receiver (receiver for status and transmitter for audio, etc.) and the wireless headphones also have a wireless transmitter connected to the antenna 24 to transmit the battery low status.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A television system comprising:
   a television, having a processing element and a wireless transmitter of audio information, controlled by the processing element;
   a wireless headphone, having a wireless transceiver that receives the audio information transmitted by the wireless transmitter on the television, and transmits information indicative of a first status wirelessly;
   a holder for the wireless headphone, which provides charging to the wireless headphone and also detects a second status of the wireless headphone, where the second status is communicated to the processing element in the television,
   where the first status includes a charge level of a battery in the wireless headphone being lower than a specified amount, and transmits the status indicating that the charge level is lower than the specified amount, where the television displays a message indicating that the charge level in the wireless headphone is lower than the specified amount,
   where the second status detected by the holder includes that the wireless headphone is being held on the holder, where the television stops providing the audio information being wirelessly transmitted responsive to receiving the second status indicating that the wireless headphone is being held on the holder.

2. The television system of claim 1, wherein the holder includes a hook apparatus, the hook apparatus extending from the television, and a switch and the switch interfaced to the processing element where placement of the wireless headphone on the hook apparatus results in the second status indicating that the wireless headphone is being held on the holder an inactive status signaled to the processing element.

3. The television system of claim 2, wherein the hook apparatus includes a battery charger used to charge a rechargeable battery within the wireless headphone.

4. The television system of claim 3, wherein the battery charger includes a pair of contacts on an outside surface of the hook
   apparatus, the pair of contacts interfacing with a matching pair of contacts on the wireless headphone.

5. The television system of claim 3, wherein the battery charger includes a coil within the hook apparatus, the coil energized with an AC signal, thereby energizing a matching coil in the wireless headphone.

6. The television system of claim 1, wherein the holder includes a headphone docking station, the headphone docking station interfaced to the television, with a switch and the switch interfaced to the processing element whereas, placement of the wireless headphone on the headphone docking station results in activation of the switch and indication of an inactive status at the processing element.

7. The television system of claim 6, wherein the headphone docking station includes a means for transferring power to the wireless headphone, the power used to charge a rechargeable battery within the wireless headphone.

8. The television system of claim 7, wherein the means for transferring power includes a pair of contacts on an outside surface of the headphone docking station, the pair of contacts interfacing with a matching pair of contacts on the wireless headphone.

9. The television system of claim 7, wherein the means for transferring power includes a coil within the headphone docking station, the coil energized with an AC signal, thereby energizing a matching coil in the wireless headphone.

10. A method for controlling a television responsive to wireless headphones, the method comprising:
    wirelessly transmitting and receiving from a television to a wireless headphone, where the television having a wireless transmitter and a processing element;
    wirelessly transmitting a first status from the wireless headphone to the television;
    wirelessly receiving audio from the television;
    powering the wireless headphone from a rechargeable power source;
    charging the rechargeable power source from a holder, the holder having a device that detects a second status of the wireless headphones being either active or incactive depending on whether they are connected to said holder or unconnected to said holder and relays the second status to the processing element;
    detecting a change of the second status; and if the change indicates the headphones are active, enabling the wireless transmitter to send an audio signal from the television to the wireless receiver in the wireless headphone and disabling speakers associated with the television;
    if the change indicates the headphones are inactive, disabling the wireless transmitter and routing the audio signal from the television to the speakers associated with the television; and
    if the first status indicates a charge level of a battery in the wireless headphone being lower than a specified amount, displaying a status message on the television indicating that the charge level is lower than the specified amount.

11. The method of claim 10, wherein the holder includes a hook apparatus, the hook apparatus extending from the television, the hook apparatus interfaced to a switch and the switch interfaced to the processing element whereas, placement of the wireless headphone on the hook apparatus activates the switch indicating the wireless headphone is inactive.

12. The method of claim 10, wherein the holder includes a headphone docking station, the headphone docking station interfaced to the television, including a pair of contacts on an outside surface, the pair of contacts interfacing with a matching pair of contacts on the wireless headphone, whereas, the step of detecting a change of the status includes detecting current flowing from the pair of contacts to the matching pair of contacts, the current flowing indicates the wireless headphone is inactive.

13. The method of claim 10, wherein the holder includes a headphone docking station, the headphone docking station interfaced to the television, the headphone docking station including a coil within the headphone docking station, the coil energized with an AC signal, thereby energizing a matching coil in the wireless headphone, whereas, the step of detecting a change of the status includes detecting an increase of current of the AC signal, the increase of current indicates the wireless headphone is inactive.

14. A method for controlling a television responsive to wireless headphones, the method comprising:
    providing a television, the television having a wireless transmitter and a processing element; providing a wireless headphone, the wireless headphone having a rechargeable power source and a wireless receiver, the wireless receiver powered by the rechargeable power source;
    providing a holder, the holder having a device that detects a status of the wireless headphones and relays the status to the processing element;

detecting a change of the status; if the change indicates the headphones are active, enabling the wireless transmitter to send an audio signal from the television to the wireless receiver in the wireless headphone and disabling speakers associated with the television;

if the change indicates the headphones are inactive, disabling the wireless transmitter and routing the audio signal from the television to the speakers associated with the television , wherein the television also comprises a television wireless receiver and the wireless headphone also comprises a headphone wireless transmitter and the method further comprises the step of: if the change indicates a low condition of the rechargeable power source, sending a low-battery status from the headphone wireless transmitter to the television wireless receiver and the television disabling the wireless transmitter and routing the audio signal from the television to the speakers associated with the television.

15. A television system comprising:

a television, the television having a wireless transceiver and a processing element, the processing element interfaced to the wireless transceiver;

a wireless headphone, the wireless headphone having a wireless transceiver, a rechargeable power source and at least one ear piece, the at least one ear piece converting an electrical audio signal received from the wireless transceiver of the wireless headphone into sound waves; and a holder having a place to hold the wireless headphone, the holder having a detector, the detector signaling the processing element when the wireless headphones are in place on the holder, the holder providing charging to a rechargeable power source in the wireless headphone and also detecting a status of the wireless headphone, where the status is communicated to the processing element in the television, where a first status includes a charge level of a battery in the wireless headphone being lower than a specified amount, and transmits the status indicating that the charge level is lower than the specified amount, where the television displays a message indicating that the charge level in the wireless headphone is lower than the specified amount, where a second status detected by the holder includes that the wireless headphone is being held on the holder, where the television stops providing the electrical audio signal responsive to receiving the second status indicating that the wireless headphone is being held on the holder.

16. The television system of claim 15, wherein the holder is a hook extending from the television and the detector is a switch mechanically interfaced to the hook such that placement of the wireless headphone on the hook results in closing of contacts of the switch.

17. The television system of claim 16, wherein the hook includes a pair of contacts on an outside surface, the pair of contacts interfacing with a matching pair of contacts on the wireless headphone thereby providing power to the wireless headphones to charge the rechargeable power source.

18. The television system of claim 16, wherein the hook includes a coil, the coil energized with an AC voltage, the coil interfacing with a matching coil in the wireless headphone thereby providing power to the wireless headphones to charge the rechargeable power source.

19. The television system of claim 15, wherein the holder is a headphone docking station.

20. The television system of claim 19, wherein the headphone docking station includes a pair of contacts on an outside surface, the pair of contacts interfacing with a matching pair of contacts on the wireless headphone thereby providing power to the wireless headphones to charge the rechargeable power source.

21. The television system of claim 19, wherein the headphone docking station includes a coil within the headphone docking station, the coil energized with an AC signal, thereby energizing a matching coil in the wireless headphone, the matching coil interfaced to a charging circuit, the charging circuit providing a charge current to the rechargeable power source.

* * * * *